United States Patent [19]

Masuhara et al.

[11] Patent Number: 4,993,454
[45] Date of Patent: Feb. 19, 1991

[54] PIPING BRANCH STRUCTURE

[75] Inventors: Yasuhiro Masuhara, Hitachi; Osamu Yokomizo, Ibaraki; Koichi Kotani; Shinichi Kashiwai, both of Hitachi; Iwao Yokoyama, Kitaibaraki, all of Japan

[73] Assignee: Hitachi, Ltd., Tokyo, Japan

[21] Appl. No.: 925,907

[22] Filed: Nov. 3, 1986

Related U.S. Application Data

[63] Continuation of Ser. No. 678,594, Dec. 5, 1984, abandoned.

[30] Foreign Application Priority Data

Dec. 16, 1983 [JP] Japan .................. 58-236296

[51] Int. Cl.$^5$ .............................................. G21D 1/00
[52] U.S. Cl. ........................ 137/561 A; 137/561 R
[58] Field of Search ............... 137/561 R, 561 A, 563, 137/889; 4/211

[56] References Cited

U.S. PATENT DOCUMENTS

| | | | |
|---|---|---|---|
| 1,097,982 | 5/1914 | Luft | 4/211 |
| 3,103,942 | 9/1963 | Sharp | 137/561 R |
| 3,496,261 | 2/1970 | Parr | 137/561 R X |
| 4,480,656 | 11/1984 | Johnson | 4/211 |

FOREIGN PATENT DOCUMENTS

| | | | |
|---|---|---|---|
| 1459584 | 11/1969 | Fed. Rep. of Germany ... | 137/561 R |
| 1044534 | 11/1953 | France | 4/211 |
| 55-80095 | 6/1980 | Japan . | |

*Primary Examiner*—John Rivell
*Attorney, Agent, or Firm*—Antonelli, Terry, Stout & Kraus

[57] ABSTRACT

A piping branch structure includes a branch pipe distributing an inflowing fluid to pipes in at least three directions, and one of the pipes face a direction of flow of the fluid, wherein a fluid inlet of one of the pipes protrudes into the branch pipe. By protruding a fluid inlet of a pipe which faces a direction of flow of the fluid into the branch pipe, the protruding pipe act as obstacles, thus no vortex is generated and the non-vortex flow state can be maintain. In case of piping of recirculating system of a reactor, an inner pipe, whose structure is integral with that of a riser pipe, is provided so that the inner pipe extends toward a master tube side in a cross branch pipe. The inner pipe is provided holes and a flow-regulating plate. The quantity of cooling water circulating through the core of the reactor and the flow state of the cooling water in the pressure vessel are stabilized and balanced.

6 Claims, 11 Drawing Sheets

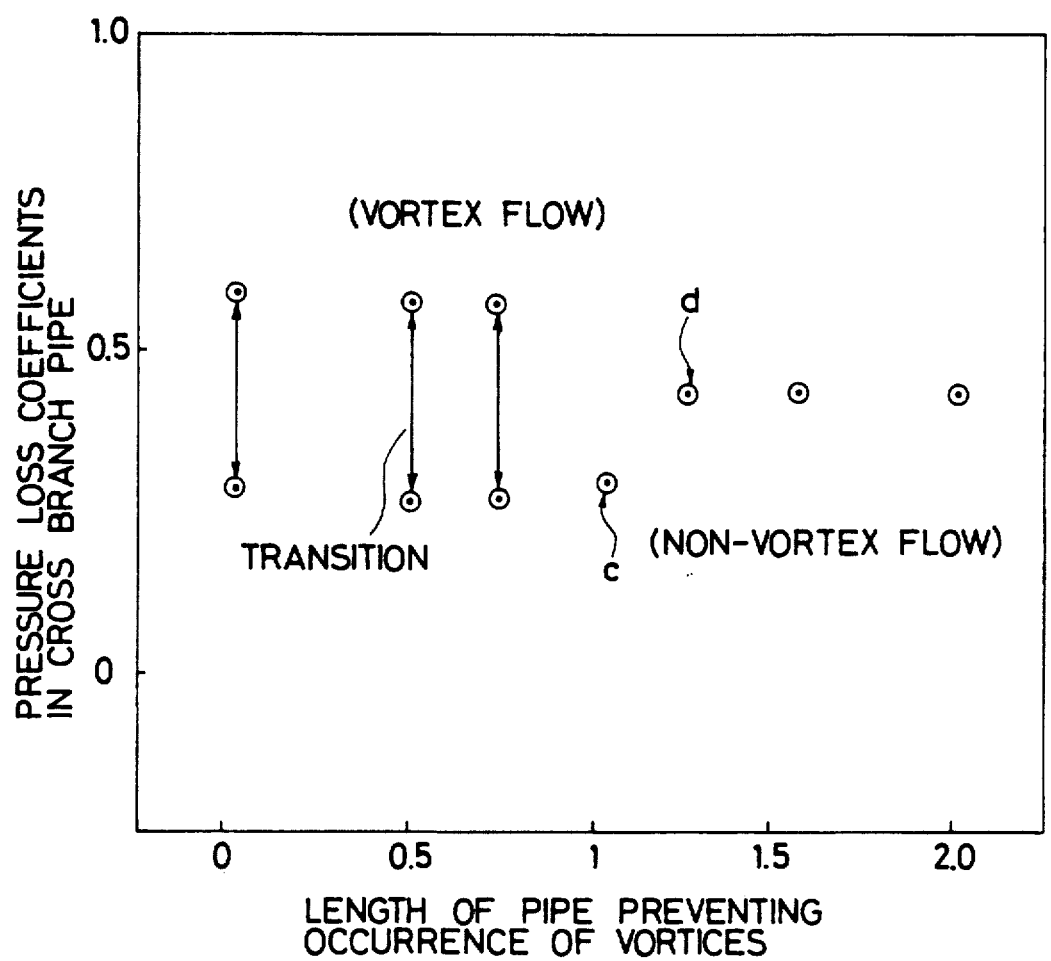

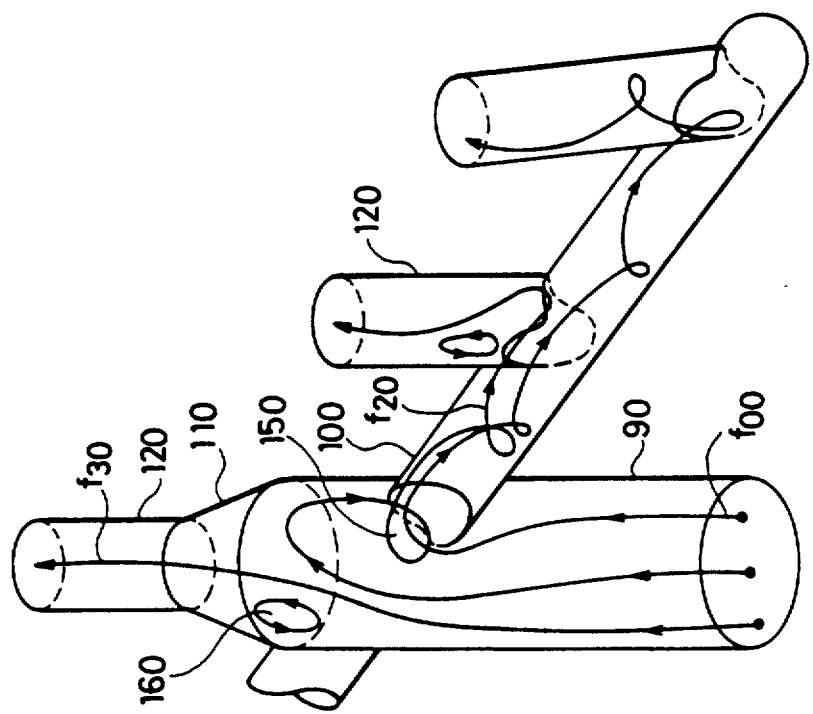
FIG. 14 (VORTEX FLOW)
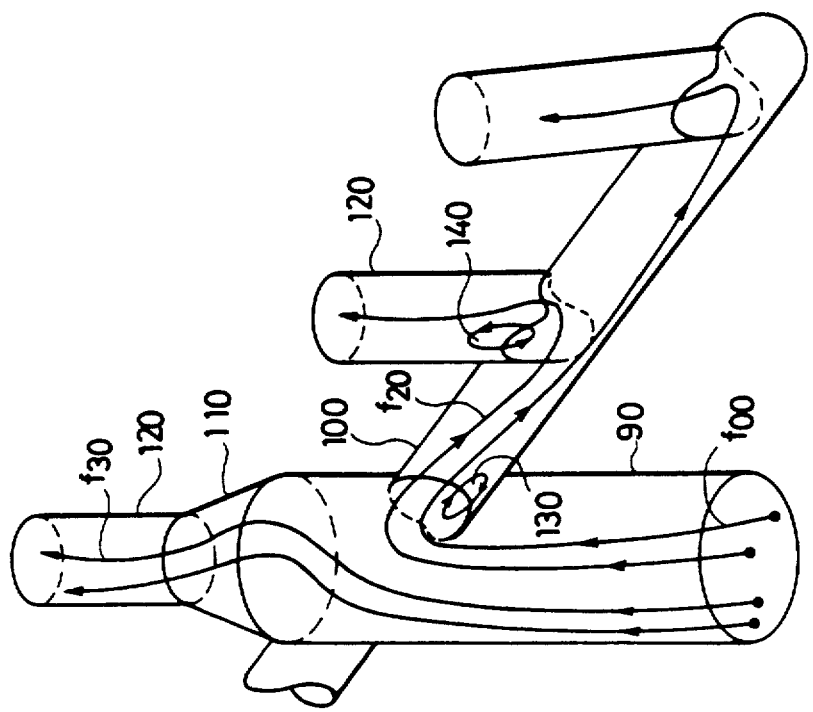
FIG. 13 (NON-VORTEX FLOW)

(NON-VORTEX FLOW)

(VORTEX FLOW)

PIPING BRANCH STRUCTURE

This is a continuation of application Ser. No. 678,594, filed Dec. 5, 1984 now abandoned.

BACKGROUND OF THE INVENTION

This invention relates a piping branch structure, and, more particularly to a piping branch structure in recirculation system of a reactor or the like.

When a boiling water reactor (BWR) plant is operating, cooling water flows through a piping of recirculating system so that the water in a pressure vessel can recirculate therethrough.

For this purpose, in, for example, Japanese Laid Open Application No. 80095180, a cross branch pipe is used in the piping.

An object of the present invention is to provide a piping branch structure wherein a fluid flow in the branch section can be stably maintained.

Another object of the present invention is to provide a piping branch structure wherein an occurrance of vortice in the fluid flow can be suppressed.

Another object of the present invention is to provide a piping branch structure wherein a non-vortex flow state can be maintained.

Another object of the present invention is to provide a piping branch structure wherein pressure losses in the each directions of flows can be maintained at a constant level and fluctuations in quantities of distributed flows can be eliminated.

In accordance with the present invention, a piping branch structure is proposed which comprises a branch pipe distributing an inflowing fluid to pipes in at least three directions, and one of said pipes facing a direction of flow of said fluid, wherein a fluid inlet of said one of pipes is protruded into said branch pipe.

In order to suppress the occurrence of a rotational flow of prior art construction, it is sufficient to prevent the generation of either one of these two vortices, so that the generation of the other vortex can be prevented thereby. By protruding a fluid inlet of a pipe which faces a direction of flow of the fluid into the branch pipe, the protruding pipe acts as obstacles, thus no vortex is generated and the non-vortex flow state can be maintain.

Also in the present invention, a length of fluid inlet of the protruding pipe is set such that an upstream end thereof passes an extension line of an inner plane on a downstream side of fluid outlets of said branch pipe which opens in directions different from that of said protruding pipe.

As a result, the flow of fluid is maintained in a single non-vortex flow state and is maintained in the non-vortex state with a small pressure loss coefficient, and thus the flow is always stable.

The present invention has the effect of suppressing the generation of vortex flow, maintaining stably flows in branch sections in a single flow state, and also maintaining stably the flow state in branch flow channels, by a construction in which a pipe receiving a separate flow in the branch pipe section protrudes toward the inside of the branch channel.

BRIEF DESCRIPTION OF THE DRAWINGS

FIG. 8 is a graphical illustration of the dependency of the pressure loss coefficient on the length that the internal pipe of the present invention protrudes toward the inside of the branch pipe;

FIG. 13 is a schematic illustration depicting the flow of cooling water in a non-vortex state in the vicinity of the conventional cross branch pipe;

FIG. 14 is a schematic illustration depicting the flow of cooling water in a vortex state in the vicinity of the conventional cross branch pipe;

DETAILED DESCRIPTION

Figure 1:
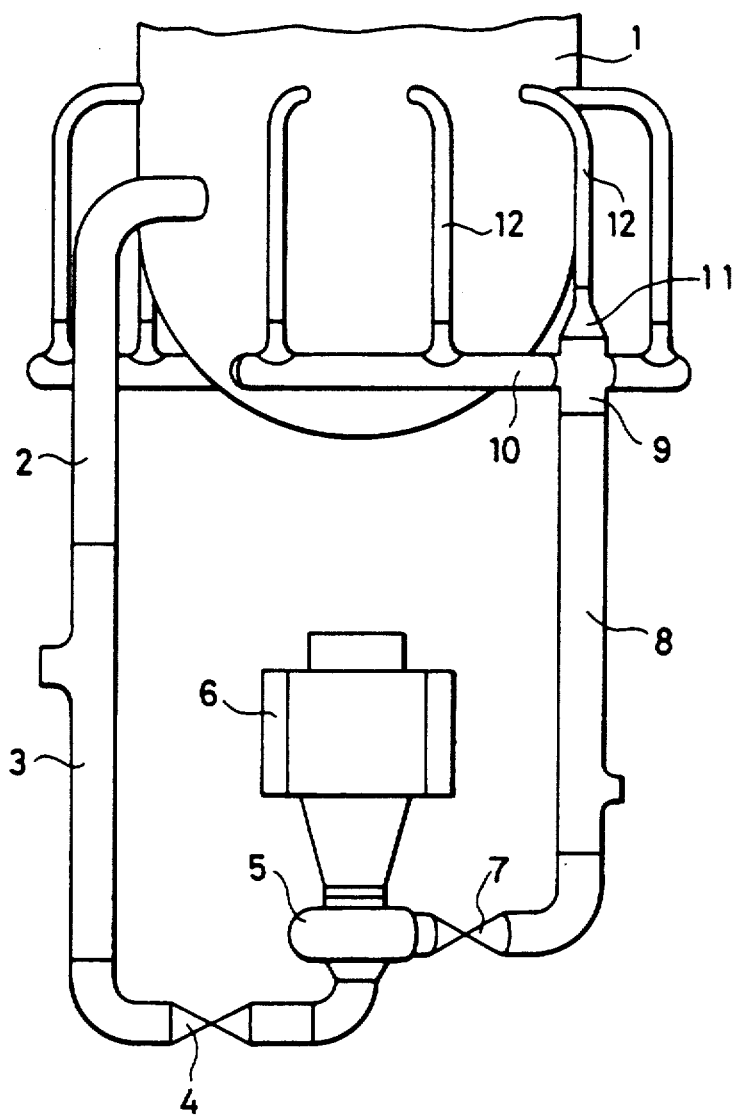
FIG. 1 is a side elevation of piping of a recirculation system of a reactor plant to which the present invention is applied.

Most atomic power plants have a core within a reactor pressure vessel, and the core is provided with a piping of a recirculation system which supplies cooling water to the core. Part of this cooling water is turned into high-pressure steam by the heat of the core, this is supplied to a turbine generator to provide an output therefrom in the form of power.

Referring now to the drawings wherein like reference numerals are used throughout the various views to designate like parts and, more particularly, to FIGS. 12-15, according to these figures, in a conventional piping branch structure, a flow $f_{00}$ of the cooling water from the master tube 80 separates at the cross branch 90 into flows $f_{10}$ and $f_{20}$ to the right and left and flows into the header bent pipes 100, and a flow $f_{30}$ in a direction of the reducer 110. The flow in this branch section was considered to run only in the directions of the arrows; although secondary flows 130, 140 occur at the joints of the pipes as shown most clearly in FIG. 13.

However, visual flow experiments have revealed that, in addition to this flow state, there is another state in which the center of the flow vortices follows turns through the bent header pipes 100 to the right and left sides, as shown in FIG. 14, and that the two states of flow shown in FIGS. 13, 14, sometimes alternate. In otherwords, the flow of the cross branch pipe 90 changes from a non-vortex flow state shown in FIG. 13 to a vortex flow state shown in FIG. 14, and back again, and thus the flow and the piping including the branch pipe is unstable.

Figure 15:
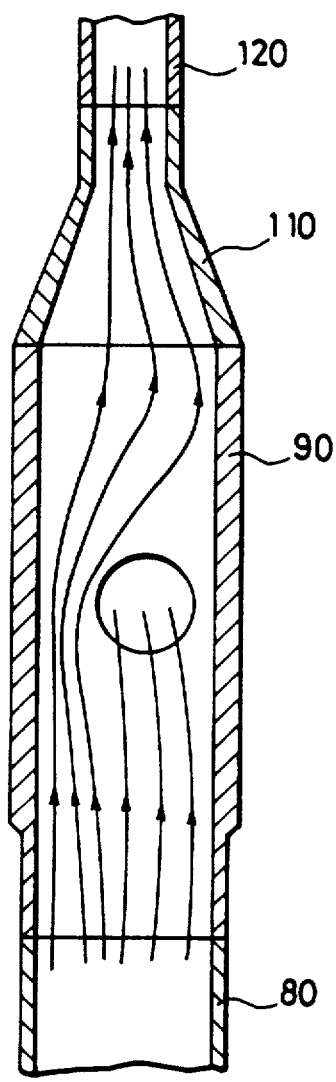
FIG. 15 is a cross-sectional view depicting the flow of cooling water during nonvortex flow thereof in the conventional cross branch pipe.
Figure 16:
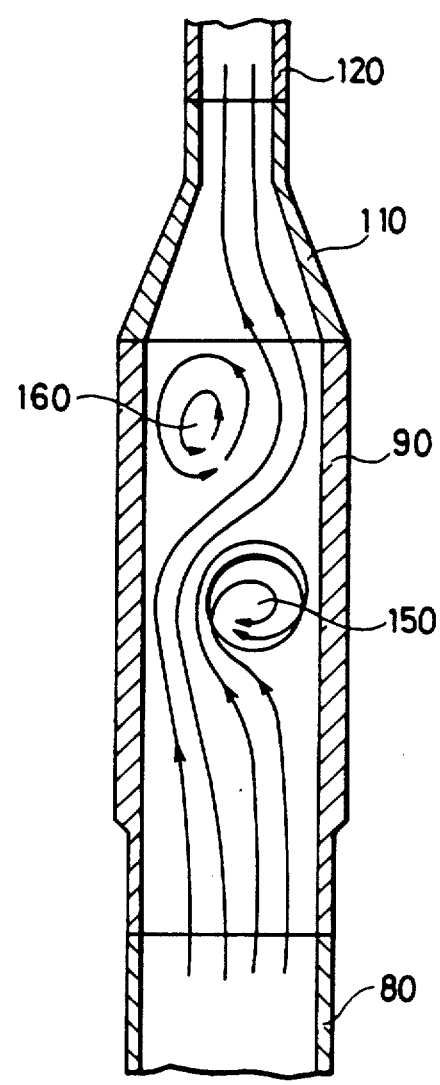
FIG. 16 is a cross-sectional view depicting the flow of cooling water during vortex flow thereof in the conventional cross branch pipe.

In the non-vortex state, the flow in the cross branch pipe separates and continues without concurrent vortices and secondary flows as shown in FIG. 15. In the vortex flow state, a vortex occurs at a portion 150 directly connected to the bent header pipe 100, and since the total angular momentum of the flow is conserved, a vortex 160 in the reverse direction occurs upstream of the reducer above the portion 150 as shown in FIG. 16.

As mentioned above, the flow in the cross branch 90 changes from the non-vortex flow state to the vortex flow state. As a result, the flow resistances in the directions of flow $f_{10}$, $f_{20}$, and $f_{30}$ (FIG. 12) in the cross branch pipe 90 vary, and consequently, the distribution of flow to each riser pipe 120 and pressure losses can vary irregularly.

Figure 4:
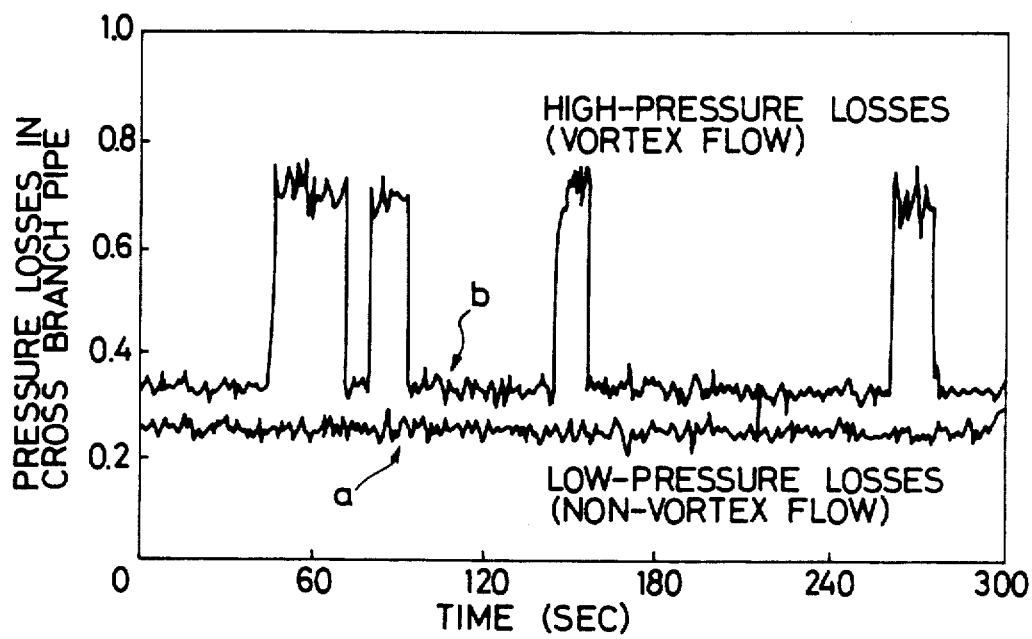
FIG. 4 is a graphical illustration of results of measurements of pressure losses caused when the structure of the branch pipe of the first embodiment of the present invention is adopted and when the conventional structure of a branch pipe is adopted.

A line b in FIG. 4 depicts the results of measurements of pressure losses obtained by experiments using a simulation of the cross branch 90. In FIG. 4, the pressure losses of the ordinate are represented by values relative to a reference pressure, the line b of FIG. 4 shows that the flow switches between the two states described above. When the results of these measurements are visualized with respect to the corresponding flow states, it is clear that the vortex flow corresponds to high pressure losses and the non-vortex flow to low pressure losses.

Accordingly, when the transition between these states, that is, a fluctuation in flow occurs, the quantity of cooling water flowing into the core of the reactor varies, and, consequently, the output of the boiling water reactor tends to vary resulting in a deterioration of controllability of the output. Additionally, there is a danger that the balance of the flow of cooling water in a pressure vessel can be lost.

In accordance with the present invention, as shown in FIG. 1, the piping of a reactor recirculation system attached to a boiling water reactor (BWR) pressure vessel 1 includes a bent tube section 2 communicating with the inside of the pressure vessel 1 with the bent tube section 2 being connected to a straight tube section 3 by a T-joint. The straight tube section 3 communicates through an inlet valve 4 with the suction port of a recirculation-system pump 5 which forcibly circulates water forcibly through the reactor pressure vessel 1.

The discharge port of the recirculation-system pump 5, driven by a motor 6, is connected to one end of a master tube 8 by an outlet valve 7, while the other end of the master tube 8 is connected to bent header pipes 10, a reducer 11 and riser pipes 12, etc., by a cross branch pipe 9. Components of the piping are connected to each other by for example butt welding.

When a boiling water reactor (BWR) plant is operating, the cooling water in the reactor pressure vessel 1 is driven by the motor 6 through the bent tube section 2, the straight tube section 3 with the T-joint, the inlet valve 4, the pump 5, the outlet valve 7, and the master tube 8 in sequence, and flows into the cross branch pipe 9.

The cooling water is distributed from the master tube 8 to a flow system on the downstream side by the cross branch pipe 9, and part of the cooling water is sent directly from the cross branch pipe 9 and injected into a jet pump within the reactor pressure vessel 1 through the reducer 11 and the riser pipe 12 positioned just above the reducer 11. Meanwhile, the rest of the cooling water is passed from the cross branch pipe 9 through the bent header pipes 10 and the riser pipes 12, other than that just above the reducer 11, and is injected into the jet pump.

Figure 2:
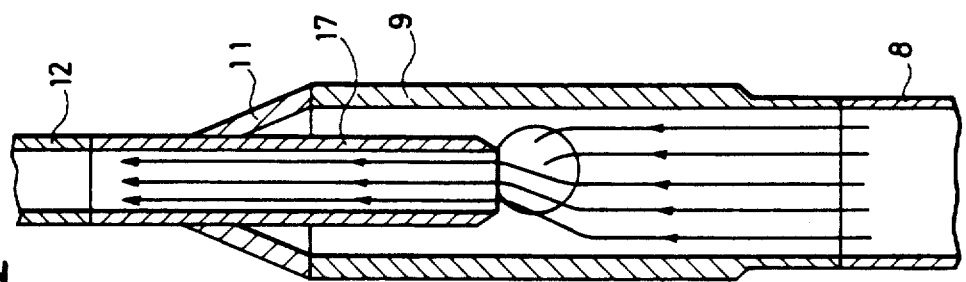
FIG. 2 is a practical cross-sectional view illustrating a flow of cooling water in vicinity of the cross branch pipe when the present invention is applied.

In a basic structure of the present invention, illustrated FIG. 2, an internal pipe (protruding pipe) 17 of a structure integral with that of the riser pipe 12 is provided within the cross branch pipe 9, and the fluid inlet of the internal pipe 17 is disposed to the portion joining directly to the bent header pipe 10. Since this construction makes it possible to prevent the generation of the vortex upstream of the reducer 11 in the example shown in FIG. 2, no vortex is generated in the portion connected directly to the bent header pipe 10, and thus the non-vortex flow state can be maintained.

Figure 3:
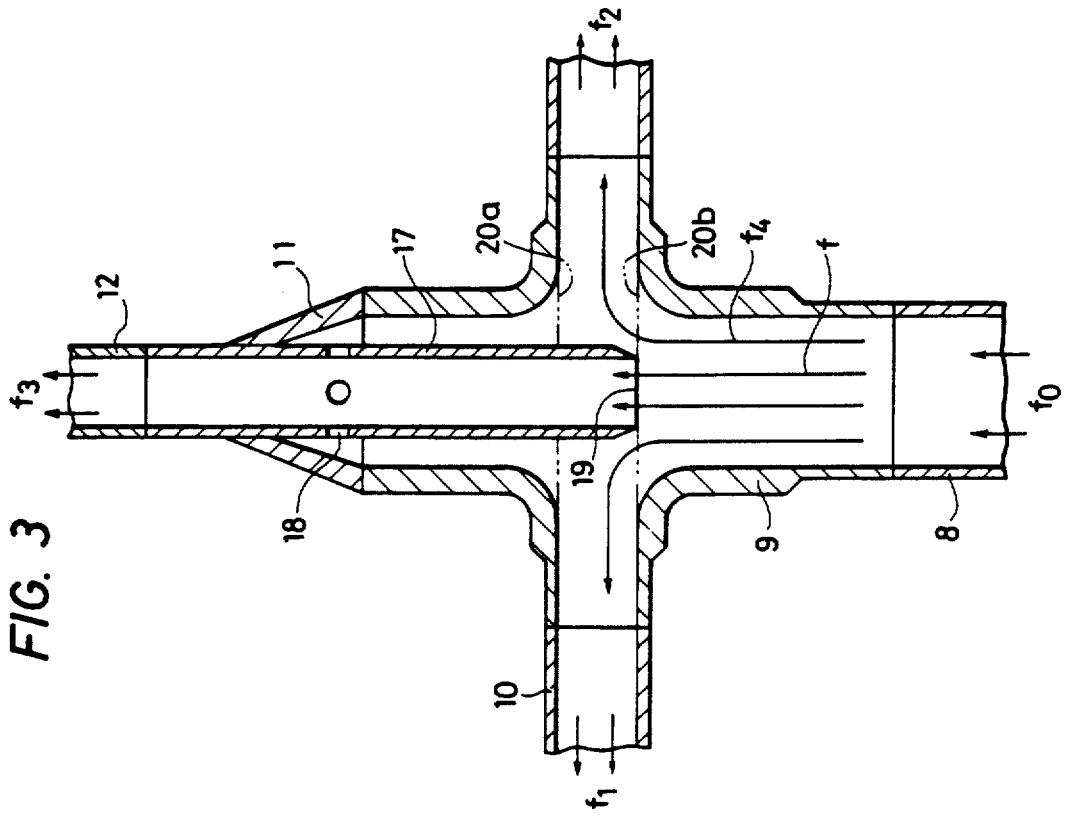
FIG. 3 is a longitudinal cross section through the inside of a cross branch pipe according to a first embodiment of the present invention.

The embodiment of FIG. 1, illustrated FIG. 3, is characterized in that the internal pipe 17 whose structure is integral with that of the riser pipe 12 is provided so that an upstream end of the internal pipes 17 protrudes toward the master tube 8 side in the cross branch pipe 9 from an inner plane 20a on a downstream side of branch pipe 9. An inlet end 19 of the cross the internal pipe 17 is positioned at the height of a plane 20b on the upstream side of the bent header pipes 10, and a plurality of holes 18 are provided in the internal pipe 17 near to the reducer 11.

Cooling water flowing into the cross branch pipe 9 runs in the direction of the arrows in FIG. 3. That is, a flow f of cooling water in the center runs into the internal pipe 17, and flows $f_4$ of cooling water at the periphery flow into the bent header pipes 10. The flows $f_4$ at the periphery separates into flows $f_1$ and $f_2$ to the right and left sides into the bent header pipes 10, and the flow f in the center becomes a flow $f_3$ and flows into the reducer 11.

In contrast to the vortex flow state which occurs in conventional piping branch structure, a non-vortex flow state is maintained in the embodiment of FIG. 3, since the internal pipe 17 acts as an obstacle to vortex flow. As a result, the flow in the recirculation system is maintained in a single non-vortex flow state, and is stabilized.

The plurality of holes in the embodiment of FIG. 3 in the internal pipe 17 in the vicinity of the reducer 11 provided the following effects.

In the absence of such holes 18 in the internal pipe 17, it could happen that the temperature of cooling water trapped in a dead-water region formed between the internal pipe 17 and the reducer 11 can be reduced by the radiation of heat from the reducer 11, and this low-temperature cooling water can flow intermittently into the bent header pipes 10. This raises the possibility that temperature differences in the cooling water generate thermal fatigue in piping, etc., and this fatigue can reduce the lifetime of the piping and welded portions.

When the plurality of holes 18 are provided in the internal pipe 17, as in the embodiment of FIG. 3, cooling water upstream of the branch pipe flows into the internal pipe through the dead-water region. Therefore, a drop in the temperature of the cooling water in the dead-water region can be prevented, and, thermal fatigue of the piping and other parts due to temperature differentials can be prevented.

The integral structure of the internal pipe 17 and the riser pipe 12 in the embodiment of FIG. 3 has the following effects.

In general, a method of providing the cross branch pipe 9 with flow-regulating plates could be conceived of for regulating the flow. Compared with the embodiment of FIG. 3, this method has problems concerning the practicability of welding within the cross branch pipe 9, the inspection of the welding and the corrosion caused by residual thermal stresses, etc.

According to the embodiment of FIG. 3, welding is used only for connecting the reducer 11 to the internal pipe 17, and thus no welding within the cross branch pipe 9 and no inspection of the welded parts in this pipe 9 are involved. Consequently, the practicability of welding is improved, the inspection of the welding is easier, satisfactory countermeasures against corrosion due to residual thermal stresses can be provided, and thus the piping is very reliable and stable.

Also, the integral structure of the internal pipe 17 and the riser pipe 12 has the following effect. Both the provision of the internal pipe to the existing riser pipe and repair of the internal pipe are easier.

Experiments were conducted to compare the effect of the present embodiment with conventional piping branch structures. FIG. 4 shows variations with time of pressure losses in the cross branch pipes, which are cited as an example of the results of these experiments. The line b of FIG. 4 shows the results for a conventional example, and the line a of FIG. 4 shows the results for the embodiment of FIG. 3.

As shown in FIG. 4, transitions occur between the vortex flow state and the non-vortex flow state, and thus the flow is unstable in the conventional example, while the flow is maintained in a single state and is thus stable in the embodiment of FIG. 3.

Figure 5:
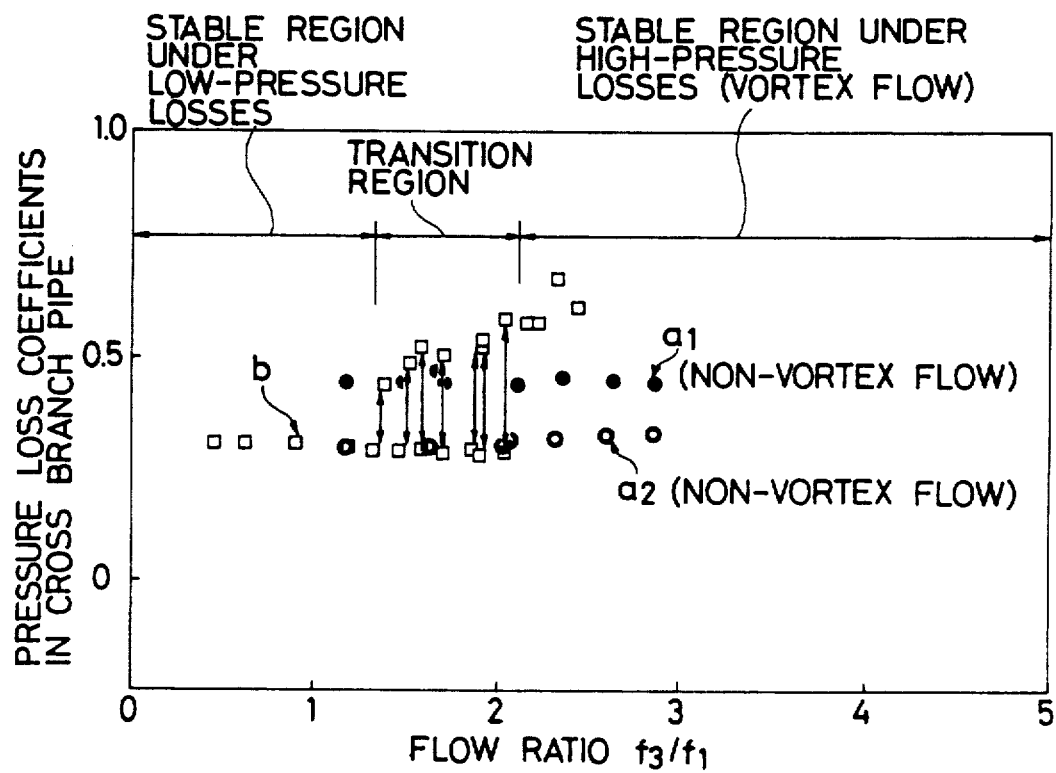
FIG. 5 is a graphical illustration of the dependency of pressure loss coefficient of the first and a second embodiments of the present invention on the distributed flow rate ratio thereof and the conventional cross branch pipe on the distributed flow rate ratio thereof.

The pressure losses shown in FIG. 4 are usually functions of flow rate, and, therefore, it is difficult to compare pressure losses under conditions of different flow speeds. Accordingly, a comparison is made using pressure loss coefficients obtained by dividing the pressure losses in the cross branch pipe by dynamic pressure $U^2/2g$, where g is the gravitational acceleration and U is the flow speed) to make the quotient nondimensional. FIG. 5 shows dependency of the ratio of flow rate ($f_3/f_1$) distributed to the central riser pipe on the pressure loss coefficient in the cross branch pipe.

In the conventional example, as represented by b (□ mark) in FIG. 5, the flow is maintained in the non-vortex state within a range in which the ratio of the flow distributed to the central riser pipe is small, while it is maintained in the vortex state within a range in which that ratio is large. It can be seen from this FIG. 5 that both vortex and non-vortex flow states can be present within an intermediate range of that ratio, so that there is a transition region between the two states, i.e., a region in which the flow is unstable.

The results for the present embodiment are shown the a1 (● mark) in FIG. 5, and, as shown in FIG. 5, the flow is maintained in the non-vortex state with a small pressure loss coefficient, and thus the flow is always stable in the embodiment of FIG. 5.

Figure 6:
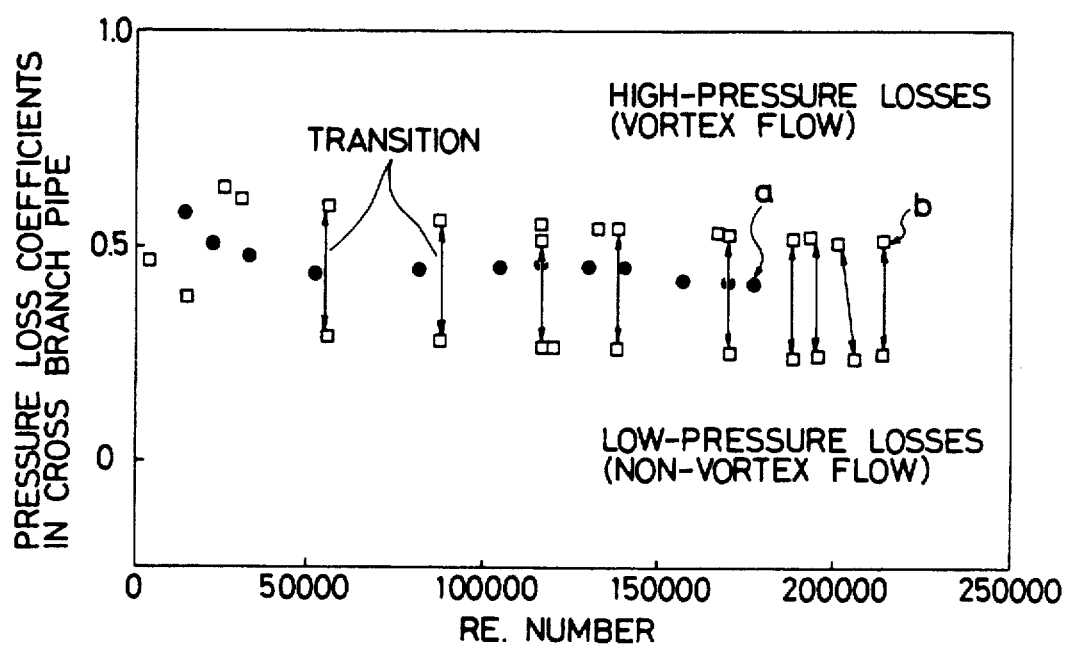
FIG. 6 is a graphical illustration of the dependency of the pressure loss coefficient on Reynolds number when the first embodiment of the present invention is adopted and when the conventional cross branch pipe is adopted.

FIG. 6 shows the characteristics of the pressure loss coefficient in relation to flow rate. The abscissa of FIG. 6 represents the nondimensional Reynolds numbers of flow speed.

In the conventional example, as shown the b (□ mark) in FIG. 6, the two vortex and non-vortex flow states are present with transitions between them, irrespective of Raynolds number, and thus the flow is unstable.

In the embodiment of FIG. 6, the flow is maintained in the non-vortex state in which the pressure loss coefficient is small, in the same way as the flow-rate distribution ration, as shown the a (● mark) in FIG. 6. Therefore, in the present embodiment the flow in the cross branch pipe 9 can be maintained in the non-vortex state in relation to flow rate or flow-rate distribution ratio, so that the stability of the flow in the recirculation system, and, thus, the controllability of the reactor, can be improved.

Figure 7:
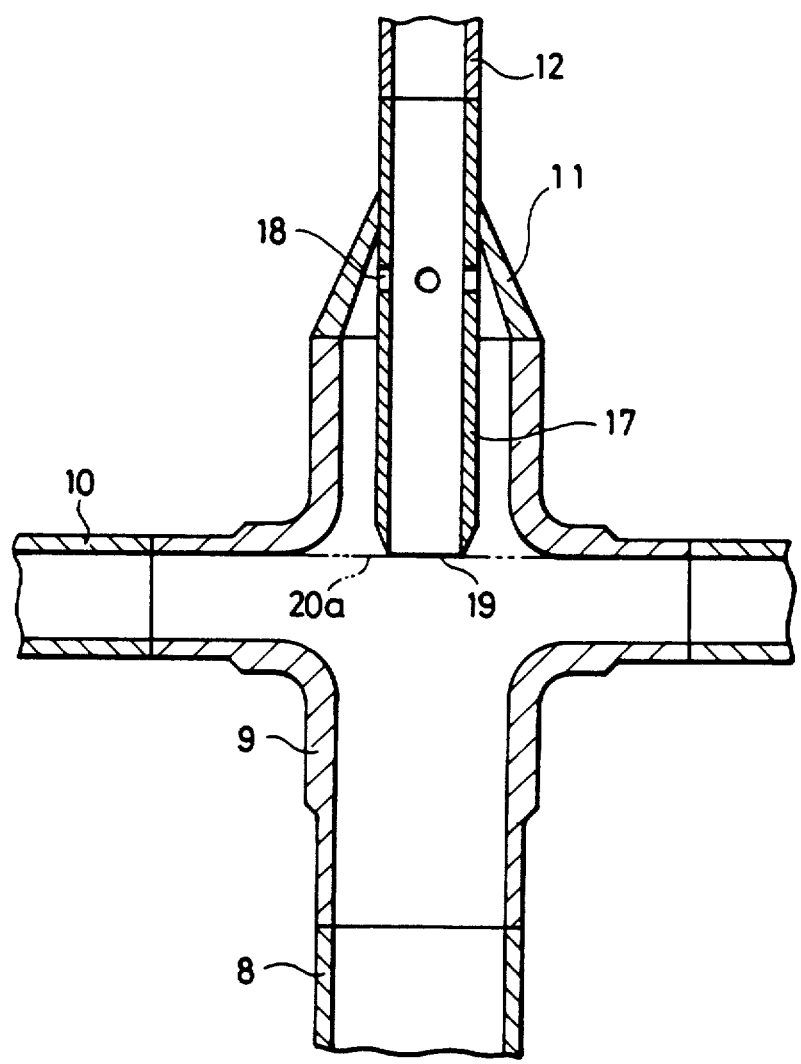
FIG. 7 is a longitudinal cross section through the inside of a cross branch pipe according to a second embodiment of the present invention.

FIG. 7 shows a second embodiment of the present characteristics of the embodiment of FIG. 7 lie in that the length of the internal pipe 17, provided within the cross branch pipe 9, is smaller than that of the internal pipe of the first embodiment, and the inlet end 19 of the internal pipe 17 is positioned at the height of a plane 20a on the downstream side of the bent header pipes 10.

Because of this structure, the flow in the cross branch pipe 9 can be maintained in a single, non-vortex flow state in the same way as in the embodiment of FIG. 3, and the pressure loss coefficient in the cross branch pipe can be reduced (as shown the a2 in FIG. 5), since the length of the internal pipe 17 is reduced.

It should be noted, that if the length of the internal pipe 17 is too small, the flow in the cross branch pipe 9 becomes unstable, although the pressure loss coefficient becomes smaller as the internal pipe 17 is shortened. In order to make this clear, experiments were conducted while varying the length of the internal pipe 17. The results of these experiments are shown in FIG. 8.

The abscissa of the graph of FIG. 8 has no units because the lengths are represented by values relative to the length of the protrusion of the internal pipe 17 toward the inside of the cross branch pipe 9 of FIG. 7, which is set as a reference value of 1. In FIG. 8, the reference characters c, d, respectively indicate in the second and the first embodiments of the invention.

As shown in FIG. 8, the flow becomes unstable if the length of the protrusion of the internal pipe 17 toward the cross branch pipe is made smaller than that in the present embodiment. In other words, it can be seen that the length of the internal pipe 17 of the second embodiment is the limiting value on the shortest side.

Figure 9A:
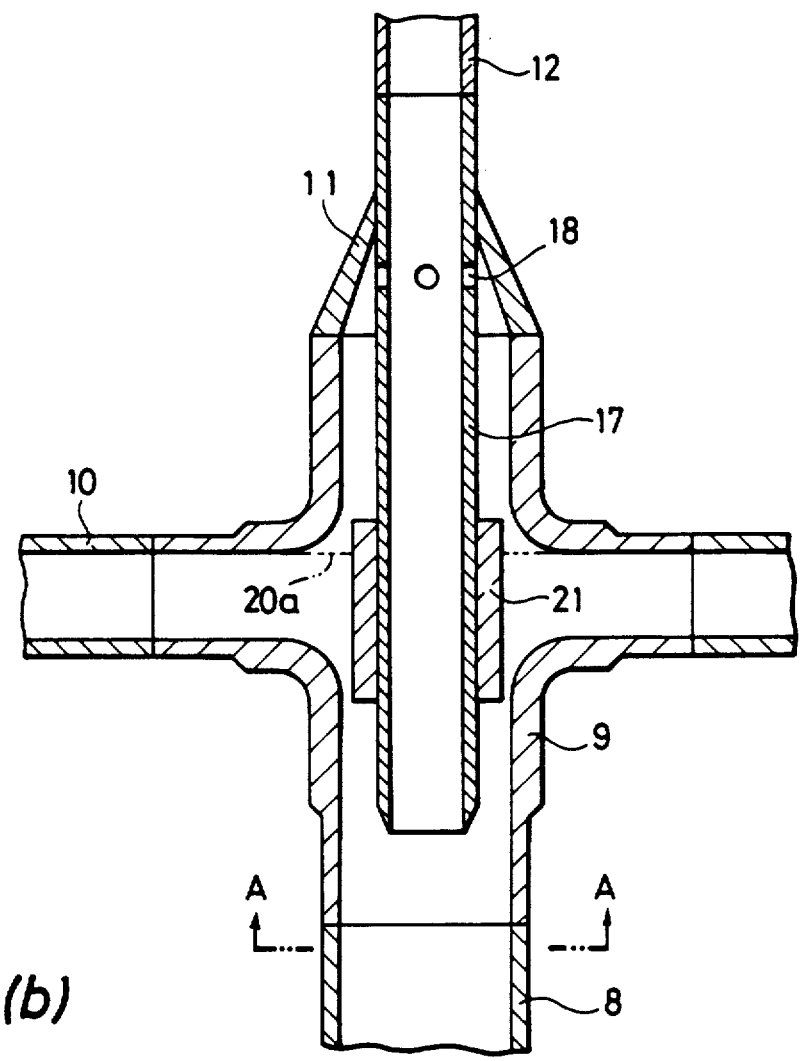
FIG. 9(a) is a longitudinal cross section through the inside of a cross branch pipe according to another embodiment of the present invention.
Figure 9B:
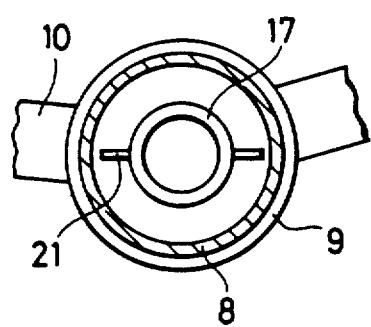
FIG. 9(b) is a cross section taken along the lines A—A of FIG. 9(a)

In FIGS. 9(a) and 9(b), the internal pipe 17 protrudes nearly as far as the master tube 8, and the flow-regulating plate 21, comprising two plates, is attached to the pipe 17 in the middle of the protruding portion thereof in such a manner that two plates are positioned opposite the fluid inlets of the bent header pipes 10, and the surfaces of the plates are vertical.

A fourth another embodiment of the present invention (not shown) has a construction in which the flow-regulating plate 21 comprising four plates is attached to the internal pipe 17 in a cruciform arrangement.

The flow-regulating plate 21 of the embodiment of FIGS. 9(a), 9(b) and the fourth embodiments are arranged so to overlap at least partially the width of fluid outlets of cross branch pipe 9 which open in bend header pipes 9 directions.

In both of the embodiment of FIGS. 9(a), 9(b) and the unillustrated embodiment, the flow-regulating plate 21 acts as an obstacle, together with the internal pipe 17, to a vortex flow. Therefore it is difficult for a vortex flow to start, and, thus, the flow is stable in a single state. The unillustrated embodiment is more effective in preventing vortex flow than the of FIGS. 9(a), 9(b), because the surfaces of the obstacles of the former to the vortex flow are broader than those of the latter.

In both of the embodiment of FIGS. 9(a), 9(b) and the unillustrated embodiment, it is not necessary to weld the flow-regulating plate 21 to the internal surface of the cross branch pipe 9, and, thus, the welding and the inspection of the welds, etc., are made easier than in the case in which the flow-regulating plate 21 is welded to the inside of the cross branch pipe 9.

Figure 10:
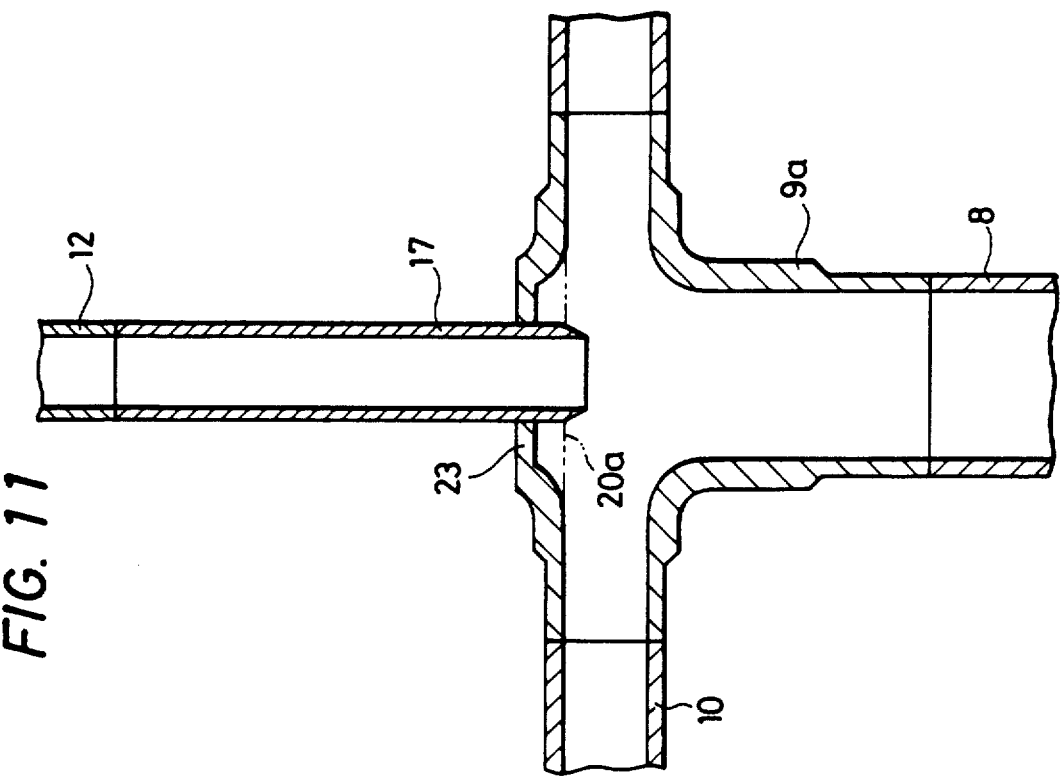
FIG. 10 is a longitudinal cross section through the inside of a cross branch pipe according to a further embodiment of the present invention.

In the embodiment of FIG. 10, a spiral plate 22 is provided as a flow-regulating plate at the end of the internal pipe 17.

According to the embodiment of FIG. 10, rotation of the flow in the direction of the bent header pipes 10 can be prevented because the flow running into the cross branch pipe 9 can be rotated in the axial direction of the cross branch pipe 9, and, therefore, the spiral plate 22 is effective in improving the stability of the flow in the piping of the recirculation system.

Figure 11:
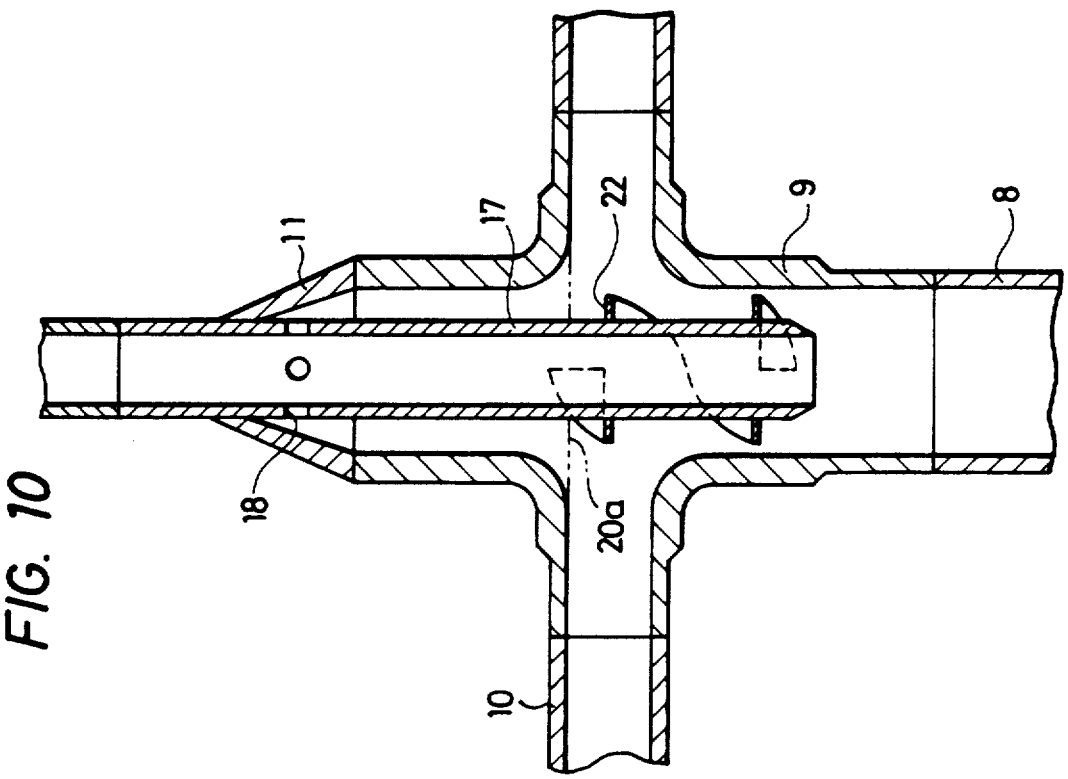
FIG. 11 is a longitudinal cross section through the inside of a cross branch pipe according to a sixth embodiment of the present invention.
Figure 12:
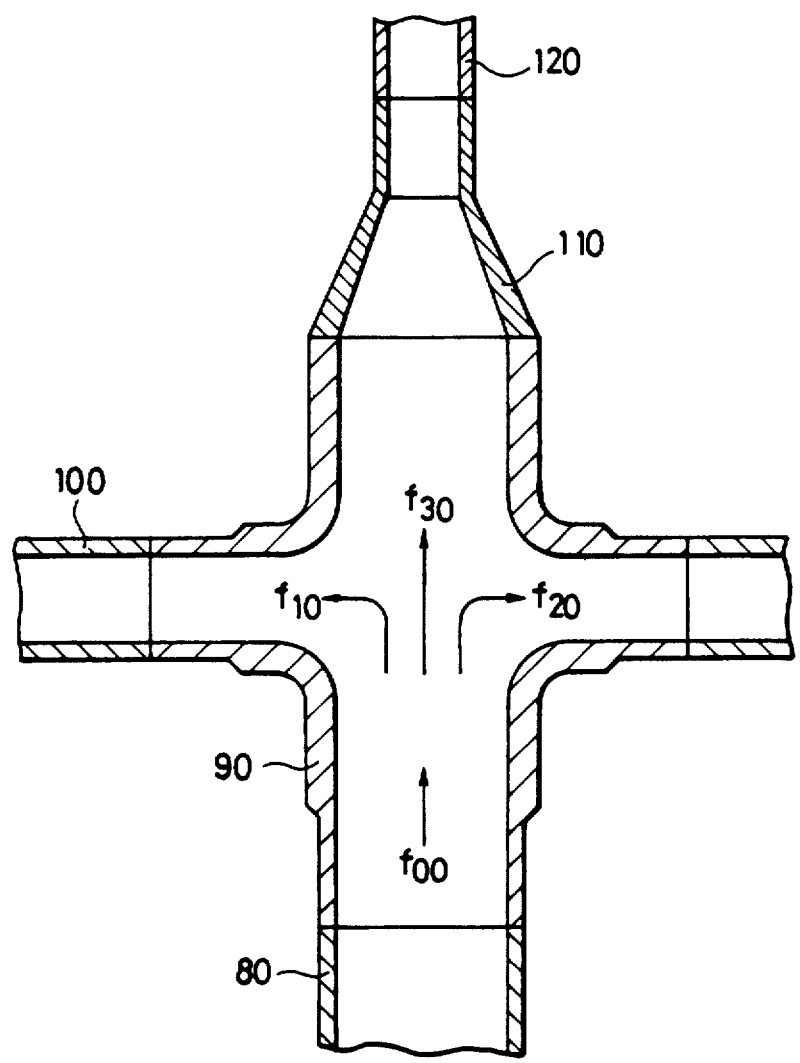
FIG. 12 is a longitudinal cross section through a conventional cross branch pipe.

In embodiment of FIG. 11, the reducer of the conventional piping branch system and the upper portion of the cross branch pipe 9 are replaced by a cover 23, and the internal pipe 17 protrudes into a branch pipe 9a through the cover 23 from a plane 20a on a downstream side of the cover 23.

According to the embodiment of FIG. 11, the dead-water region around the internal pipe 17 is greatly reduced, and, thus, the possibility of the generation of thermal fatigue due to temperature differentials is eliminated. Therefore the embodiment of FIG. 11 has the effect of improving the stability and reliability of the piping, and also the effect that no fluctuations occur in the flow rate in the direction of each separate flow, since the protruding portion of the internal pipe 17 acts as an obstacle to vortex flow so that the flow is stabilized to a single flow state.

In any of the embodiments described above, each separate flow can always be kept in a single flow state in which no vortices occur and no fluctuations in the pressure losses occur in the direction of each separate flow. Therefore, the quantity of cooling water circulating through the core of the reactor and the flow state of the cooling water in the pressure vessel are stabilized and balanced. Consequently, the output of the reactor is always maintained in a stable manner, and danger of fluctuations in the thermal load on the pressure vessel due to variations in the flow of the cooling water in the pressure vessel is eliminated.

What is claimed is:

1. A reactor recirculation system piping branch structure comprising a cross branch pipe distributing an inflowing water to three pipes in three directions, a first and second of said three pipes comprising bent header pipes each having a ring-shape disposed in opposition to each other and respectively disposed at a right angle to the inflowing water, and a third of the three pipes faces a direction of flow of the inflowing water, a fluid inlet of said third pipe of the three pipes protrudes into said cross branch pipe and has a substantially constant diameter over an entire length thereof, and a length of a fluid inlet of said protruding pipe is set such that an upstream end thereof passes an extension line of an inner plane on a downstream side of fluid outlets of said first and second pipes, whereby the flow of water surrounding said third pipe protruding into said cross-branch pipe is maintained in a single non-vortex flow state and pressure losses in each direction of flow are maintained at a constant level.

2. A reactor recirculation system piping branch structure according to claim 1, further comprising a reducer means connected to said cross-branch pipe, said reducer means is installed at a downstream side of said third pipe, wherein said third pipe protruding into said cross-branch pipe is provided with lateral openings in a protruding portion thereof in a vicinity of the reducer means so as to prevent a drop in temperature of water in a dead-water region formed between said third pipe and the reducer means.

3. A piping branch structure comprising a branch pipe distributing an inflowing fluid to pipes in at least three directions, and one of said pipes faces a direction of flow of said fluid, a fluid inlet of said one of the pipes protrudes into the branch pipe, a length of the fluid inlet of said protruding pipe is set such that an upstream end thereof passes an extension line of an inner plane on a downstream side of fluid outlets of said branch pipe which open in directions differing from that of said protruding pipe, and wherein said protruding pipe is provided with flow-regulating plate means arranged so as to overlap at least partially a width of fluid outlets of said branch pipe which opens in directions differing from that of said protruding pipe.

4. A piping branch structure according to claim 3, wherein a regulating and guide direction of said flow-regulating plate means is set to be a vertical direction or a spiral direction.

5. A piping branch structure in a recirculation system piping of a reactor comprising a master tube, a cross branch pipe connecting the master tube and distributing an inflowing water, two bent header pipes each having a ring-shape disposed in opposition to each other and respectively disposed at a right angle to a flow of the inflowing water for connecting the master tube, a riser pipe, disposed in a direction of the flow of the inflowing water, and a reducer means for connecting the master tube, and disposed in a direction of the flow of the inflowing water, wherein a protruding pipe is connected to the riser pipe and has a substantially constant diameter over an entire length thereof, with the diameter of said protruding pipe being the same as a diameter of the riser pipe and a length of a fluid inlet of said protruding pipe is set such that an upstream end thereof passes an extension line of an inner plane on a downstream side of fluid outlets of the two bent header pipes, whereby the flow of water surrounding the protruding pipe is maintained in a single non-vortex flow state and pressure losses in each direction of flow are maintained at a constant level.

6. A piping branch structure according to claim 5, wherein said protruding pipe extends through the reducer means and is provided with lateral openings in a protruding portion thereof in a vicinity of the reducer means so as to prevent a drop in temperature of water in a dead-water region which is formed between said protruding pipe and the reducer means.

* * * * *